A. D. WOOD.
WOOD PULP THICKENER AND SAVE ALL.
APPLICATION FILED NOV. 14, 1912.

1,103,725.

Patented July 14, 1914.

2 SHEETS—SHEET 1.

Witnesses
Francis MacNerhany
W. W. Cullinan

Inventor
A. D. Wood.
By [signature]
Attorney

A. D. WOOD.
WOOD PULP THICKENER AND SAVE ALL.
APPLICATION FILED NOV. 14, 1912.
1,103,725.
Patented July 14, 1914.
2 SHEETS—SHEET 2.
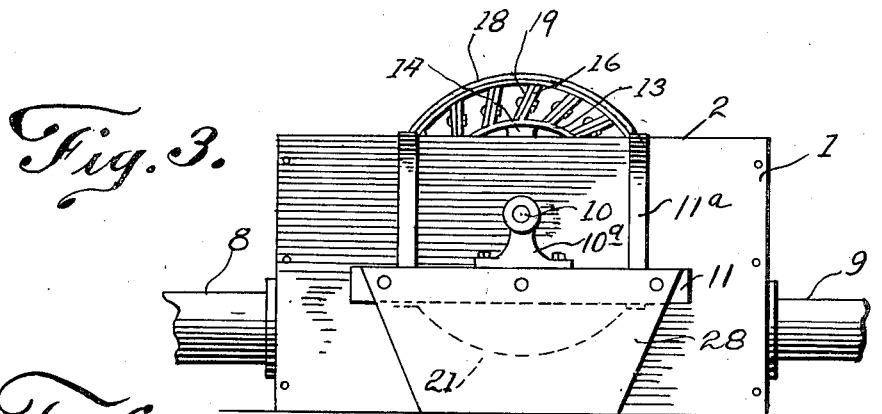
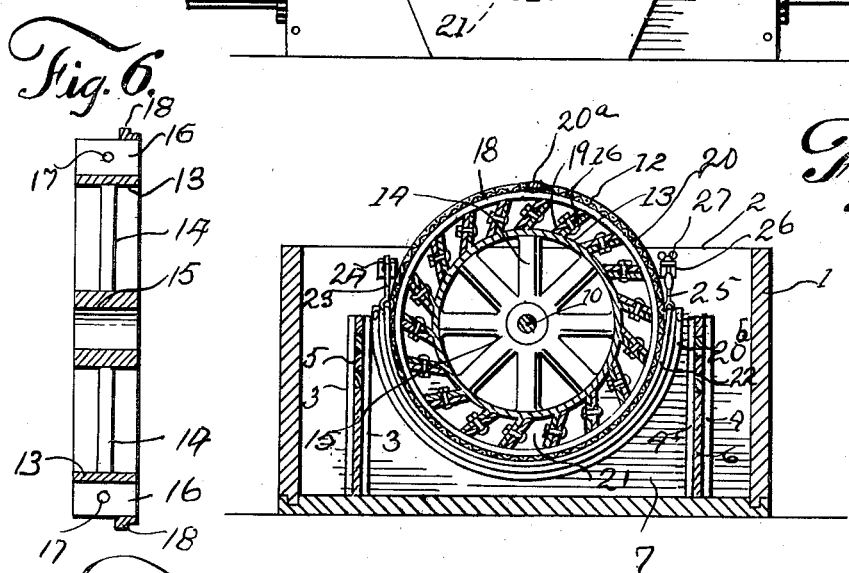
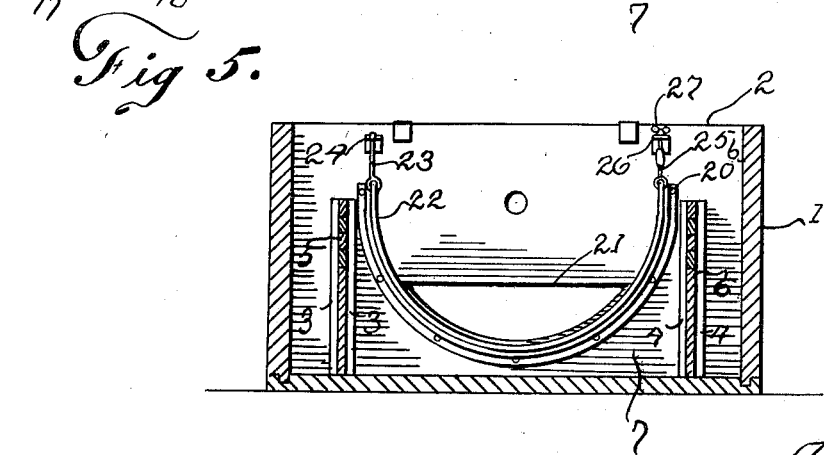

UNITED STATES PATENT OFFICE.

ALBERT D. WOOD, OF CANTON, NORTH CAROLINA.

WOOD-PULP THICKENER AND SAVE-ALL.

1,103,725.     Specification of Letters Patent.     Patented July 14, 1914.

Application filed November 14, 1912. Serial No. 731,450.

*To all whom it may concern:*

Be it known that I, ALBERT D. WOOD, a citizen of the United States, residing at Canton, in the county of Haywood and State of North Carolina, have invented certain new and useful Improvements in Wood-Pulp Thickeners and Save-Alls, of which the following is a specification.

My invention relates to the manufacture of paper pulp, and has for its object the provision of a device for thickening the pulp, the device being serviceable also in the treatment of waste water, from pulp and paper mills, for the recovery of pulp fiber.

Heretofore in devices of this character, the paper pulp and water is directed into a vat having vertical partitions over which the pulp and water flows and mounted between the vertical partitions is a rotating cylinder having a surface of foraminous material through which the water from the pulp is strained, the water flowing out through the ends of the vat while the pulp passes on and flows over the other partitions and out of the vat. The disadvantage of this style of strainer has been that particles of pulp fiber, resinous matter and the like, would adhere to the surface of the strainer and eventually clog it, obstructing the passage of water through the strainer, thereby decreasing the efficiency of the strainer and making it necessary to clear the strainer by blowing it out with steam, cleaning with acids, scrubbing with brushes, or by other methods, requiring time and labor. The above treatment cleans the strainer in a very unsatisfactory manner, and is injurious to the facing or strainer surface.

In my invention the cylindrical strainer is provided with a plurality of inclined vanes forming pockets adjacent to the strainer surface that carry up some of the water that is strained from the pulp and this water by pressing against the strainer surface and a portion of it flowing outwardly through the strainer surface, keeps it cleared of particles which ordinarily adhere thereto and obstruct the strainer.

My invention will be described in detail hereinafter and illustrated in the accompanying drawings, in which—

Figure 1:
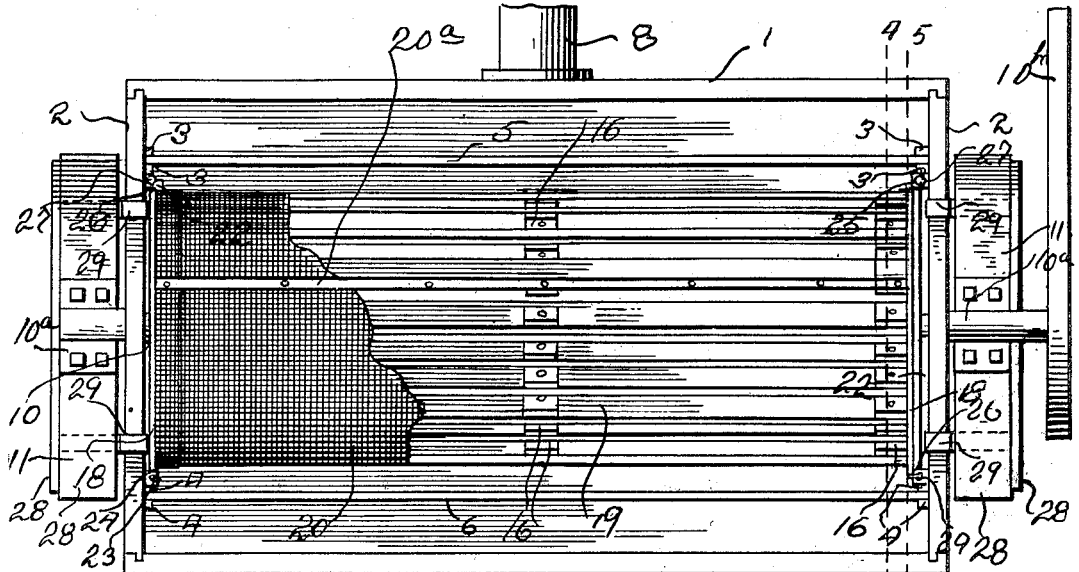
Figure 2:
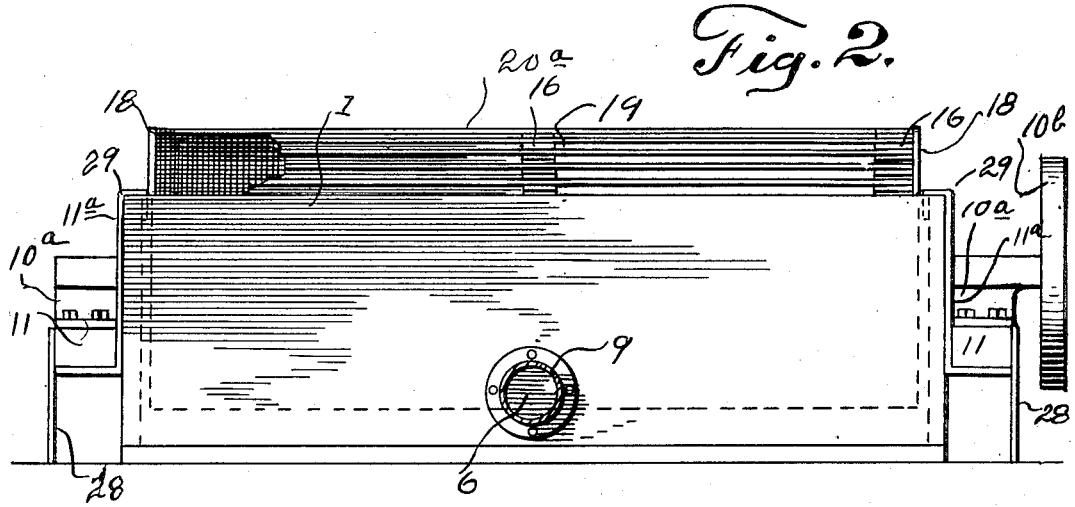

Figure 1 is a top plan view of my improved pulp thickener and save all showing the strainer partly broken away; Fig. 2, a side view showing the strainer partly broken away; Fig. 3, an end view; Fig. 4, a cross section on the plane indicated by the line 4—4 of Fig. 1; Fig. 5, a cross section on the plane indicated by the line 5—5 of Fig. 1; and Fig. 6, a cross section of one of the supporting wheels for the cylinder.

In the drawings similar reference characters will be used to designate corresponding parts throughout the several views.

1 indicates the vat having its ends 2 provided with vertical cleats 3—3 and 4—4 spaced apart in pairs adjacent to the two sides of the vat in which are removably mounted partition boards 5 and 6, said partitions 5 and 6 forming with the bottom of the vat a chamber 7 in which the wood pulp is strained.

8 indicates the inlet pipe connected with one side of the vat and 9 the outlet connected with the opposite side of the vat, it being understood that the water and pulp enter the vat 1 through the inlet pipe 8, flow over the partition 5 and into the chamber 7, and after being strained by the instrumentalities hereinafter described, the thickened pulp passes over the partition 6 and flows out through the outlet 9.

10 indicates a shaft journaled in journal boxes 10ª mounted on beams 11 supported by means of brackets 11ª engaging the upper margins of the ends 2 of the vat 1, said shaft 10 being actuated by means of a belt 10ᵇ connected with any suitable source of power or any other gearing may be substituted therefor.

A cylinder 12 is mounted upon the shaft 10 and consists of pulleys 13 keyed to said shaft and provided with the spokes 14 radiating from the hubs 15. 16 indicate vanes extending from the rims of the pulleys 13 and at an angle to the radius thereof, each of said vanes being provided with a cored opening 17. The cylinder as shown in the drawings is provided with three pulleys 13, one at each end and one intermediate of the ends, the pulley intermediate of the ends being as described above, while the pulleys forming the ends of the cylinder are each provided with a ring 18 secured to the outer margins of the vanes 16 at the outer end of the cylinder.

19 indicate slats secured to the vanes 16 by means of bolts or other suitable fastenings inserted through the openings 17 heretofore described and through suitable openings provided in said slats, said slats 19 extending throughout the length of the cylinder 12.

20 indicates a covering of wire gauze fabric mounted upon the slats 19 and having its overlapped edges secured by means of a strip of wood or other suitable material 20ª, the nails or other securing means engaging said strip 20ª being driven through said strip to the overlapped ends of the covering of fabric 20 and one of the slats 19 heretofore described.

In place of the wooden strip 20ª, the ends of the wire gauze fabric 20 may be secured in any other suitable manner such as sewing or soldering the wire if desired and furthermore, in order to hold the fabric in place on the cylinder, several of the strips 20ª may be secured around the cylinder on other slats 19 if desired, being preferably arranged at equal distances apart.

Secured to the inner side of each end 2 of the vat is a segmental flange 20ᵇ of angle iron that is spaced apart from the adjacent end of the cylinder 12 and each end of the vat is provided with a segmental opening 21 through which the water strained by the cylinder 12 flows from the vat.

To make the ends of the cylinder watertight, I provide a packing strip 22 of any suitable packing material such as a strip of felt secured at one of its ends by means of a bolt 23 mounted on a bracket 24 while its other end is likewise secured to a bolt 25 mounted on a bracket 26 and provided a wing nut or its equivalent 27 that is adapted to be used to tighten the packing strip 22 around the surface of the cylinder.

28 indicates a board secured to each of the beams 11 and arranged opposite the openings 21 in the ends of the vat that form spouts for the water flowing from said openings.

In operation, it will be understood that the pulp and water enters the vat 1 through the inlet pipe 8 and flows over the partition 5 into the chamber 7. The water contained in the chamber 7 flows out through the meshes of the wire covering 20 of the cylinder and the openings 21 in the ends thereof, while the pulp passes on and upward over the partition 6 and out through the outlet pipe 9. It will be understood that during the rotation of the cylinder some of the water contained within the cylinder will be caught up by the slats 19 within the pockets formed thereby and the pulp on the outside of the cylinder and carried upwardly and as the water flows through the strainer surface, some of the pulp will be deposited thereon and will be held to the strainer surface by the pressure of the liquid in the chamber 7 until on the rising side of the cylinder it reaches the level of the liquid in the chamber 7. Then the water which has been carried up in the pockets flows outwardly through the strainer surface freeing the mass adhering thereto which drops over the partition boards, the consistency of this mass being governed by the height of the partition boards which may be raised or lowered to deliver the pulp thick or thin as desired.

It will be understood that my improved thickener and save all is adapted to be used for straining the water from the pulp after washing during the process of manufacturing the pulp, and is also adapted to be used to save any particles of pulp that may go out with the waste water from the pulp mill. My improved thickener is also adapted to be used to remove the water after the bleaching process as well as after the process of screening the pulp, before its subsequent treatment by beating and refining for conversion into paper.

It will be also understood that my improved strainer may be used for other purposes than thickening wood pulp and saving particles of pulp and further as heretofore described, such for instance as filtering the water from sewage and also using as a preliminary filter for removing leaves, sticks, etc., from water in municipal filtration plants, and I do not therefore desire to be confined in the use of my invention to the manufacture of wood pulp as heretofore described.

Having thus described my invention what I claim is:—

1. In a strainer of the class described, a vat, intake and outlet ducts connected to said vat, a cylinder rotatably mounted in said vat, a removable partition at each side of said cylinder in the said vat, a packing strip extending partially around said cylinder, and having ends extending above the horizontal axis thereof, one of the ends of said strip being connected to said vat and the other end at the opposite side of the cylinder being adjustably connected to said vat, whereby said strip may be adjusted to contact closely with the end of said cylinder.

2. In a strainer of the class described, a vat, intake and outlet ducts connected to the sides of the vat, a cylinder rotatably mounted in the vat and provided with inclined vanes thereon, said vanes being inclined tangentially from said cylinder in a direction opposite to the rotation of said cylinder, a removable partition in the vat, one on each side of the cylinder, a packing strip connected at one end to the wall of the vat, said strip extending underneath the cylinder at one end, and means for adjusting said packing strip to contact firmly with the end of said cylinder.

In testimony whereof I affix my signature in presence of two witnesses.

ALBERT D. WOOD.

Witnesses:
WILLIAM J. BATTISON,
HARRY M. GEE.